United States Patent Office 2,914,087
Patented Nov. 24, 1959

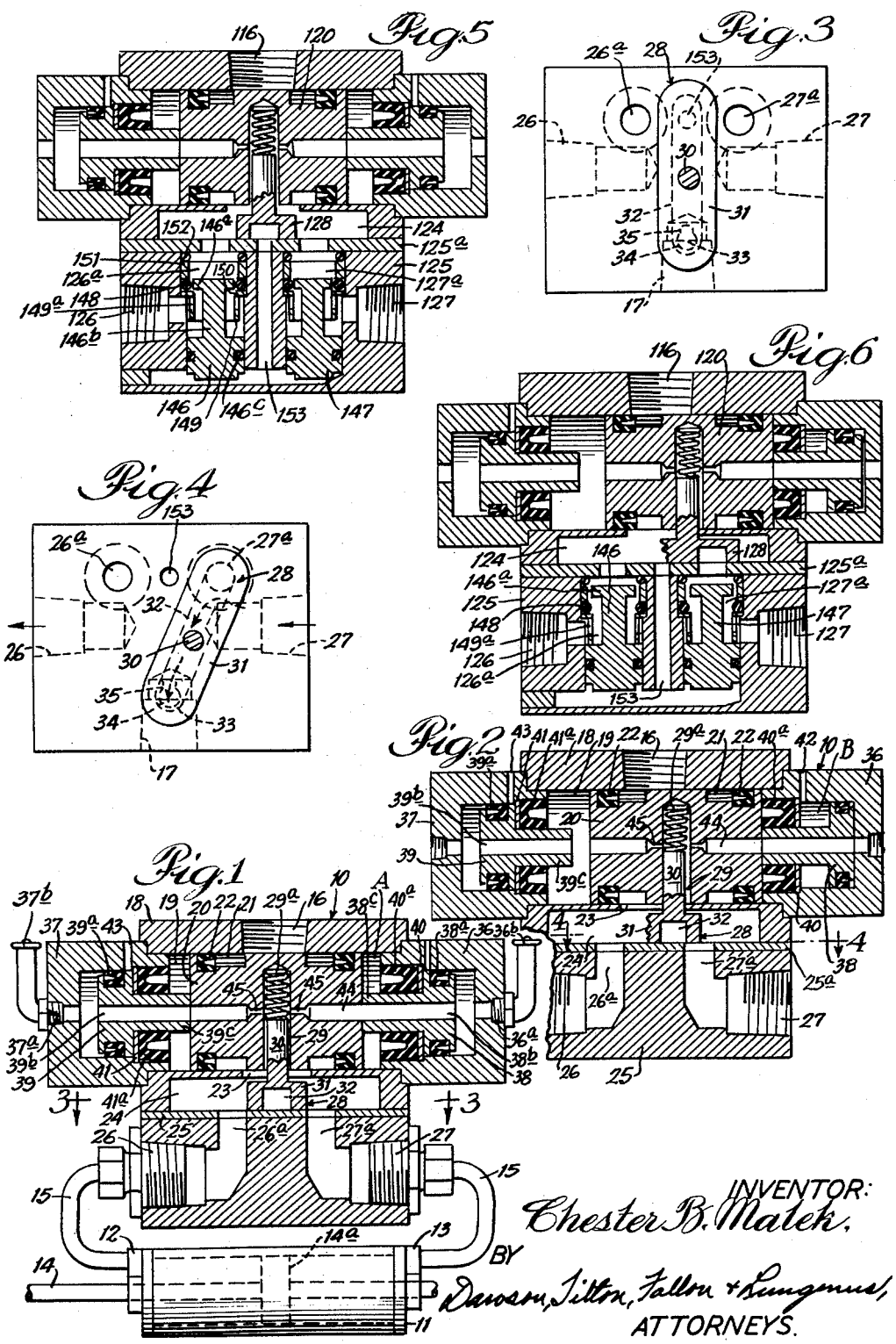

2,914,087
VALVE

Chester B. Malek, Chicago, Ill., assignor to Mead Specialties Company, Inc., Chicago, Ill., a corporation of Illinois Application March 21, 1958, Serial No. 722,967

18 Claims. (Cl. 137—622)

This invention relates to a valve, and, more particularly, to a piston-actuated valve for the transmission of pressurized fluid.

The valve of this invention has utility in transmitting pressurized fluid to and from reciprocating devices such as fluid-operated cylinders, rams, etc. The valve of this invention is an improvement on the valves shown in co-owned Patents Nos. 2,792,019 and 2,792,020, issued May 14, 1957, and reference is hereby made to those patents.

In the operation of work devices such as air cylinders, rams, etc., it is important that the moving element in such a device (i.e., the piston) be precisely positioned. This requires that the piston movement be stopped immediately upon the change in position of a valve operator. This is achieved only imperfectly in prior art devices and the valve mechanisms employed have permitted the piston or other moving element to creep or otherwise depart from a prescribed position.

It is a principal object of this invention to provide a valve that overcomes the drawbacks and disadvantages of prior art valves in failing to achieve precise positioning of a moving element. Another object is to provide a piston-actuated valve of the self-balanced type. Yet another object is to provide a valve for a fluid-operated cylinder, ram, or the like, which regulates the movement of the moving element by controlling the exhaust from the device. Still another object is to provide a valve which avoids the undesirable creep in the piston of a fluid-operated cylinder, for example, even where the piston is employed to move a resisting load. Other objects and advantages, both general and specific, can be seen as this specification proceeds.

This invention will be described in the accompanying drawing, in which.

Fig. 1 is a front elevational view, partly in section, of a valve embodying teachings of this invention and shown in an operative environment; Fig. 2 is a view similar to Fig. 1 but showing only a fragment thereof and showing valve elements in a different operative position; Figs. 3 and 4 cross-sectional views taken along the lines 3—3 and 4—4, respectively, of Figs. 1 and 2, respectively; Fig. 5 is a longitudinal sectional view of a modified form of valve; and Fig. 6 is a view similar to Fig. 3 but showing valve elements in different positions.

In the drawing, the numeral 10 designates generally a valve embodying teachings of this invention. In the illustration given, valve 10 is shown in combination with a fluid-operated cylinder 11 having fluid connections 12 and 13 at the ends thereof and a rod 14 extending out of one end and connected interiorly of cylinder 11 to a piston 14a shown in dotted line. Valve 10 is connected to cylinder 11 by means of conduits 15. Valve 10 is also equipped with an inlet port for pressurized fluid designated 16, and an exhaust port for such fluid designated 17 (seen only in Figs. 3 and 4). The general combination and arrangement just described is well known in the art, and further detailed description is believed unnecessary.

Valve 10 includes a body 18 in which is provided a cylinder-like chamber 19. Reciprocably mounted within cylinder 19 is piston 20. Piston 20 is provided with a pair of spaced annular recesses 21 in which sealing cups 22 are provided. Fluid pressure inlet 16 is provided in body 18 and communicates with cylinder chamber 19. Inlet 16 is of sufficient size so as to communicate with both recesses 21 when piston 20 is positioned centrally of the length of cylinder 19, as can be seen in Fig. 1.

The side wall of cylinder 19 opposite fluid pressure inlet port 16 is provided with a flow passage 23, and communicates cylinder 19 with chamber 24. A sub-body structure 25 is attached to body 18 and encloses the open portion of chamber 24. Sub-body 25 is equipped with a pair of flow ports 26 and 27 which communicate through conduits 15 with connections 12 and 13, respectively.

From the foregoing, it is to be appreciated that pressurized fluid such as compressed air entering inlet 16 flows around piston 20 by way of recesses 21 to opening 23 and chamber 24 and thence into ports 26 and 27, ultimately reaching cylinder 11.

In the structure just described and shown in Fig. 1, full fluid pressure is applied to both ends of work cylinder 11. This, in effect, stabilizes or balances the piston 14a of work cylinder 11 against undesirable movement. In order to change the position of the piston within work cylinder 11, one end of the cylinder 11 is provided with a reduced pressure, as can be appreciated from a consideration of Fig. 2, wherein the valve piston 20 is displaced to the right from the position shown in Fig. 1. In the condition shown in Fig. 2, port 27 is communicated with exhaust port 17, as seen in Fig. 4, through a valve element structure generally designated 28, which will now be described.

Valve piston 20 is provided with a transverse bore 29 extending partway thereacross. Loosely mounted in bore 29 is an elongated shank 30 of valve element 28, shank 30 also extending through aperture 23. The end of element 28 external of bore 29, which end is seen to be positioned within chamber 24, is enlarged and elongated in a direction transverse to the length of shank 30, the enlarged end portion being designated by the numeral 31. The outer surface (or bottom as presented in the drawing) of enlarged portion 31 is provided with a trough-shaped passageway designated 32, which extends only intermediate of the ends of the enlarged portion 31. One end of the enlarged portion 31 is pivotally mounted as at 33 on a circular shoulder 34 provided by sub-body 25 and which extends into chamber 24. Shoulder 34 has its central portion communicating with exhaust 17 and part of one side wall cut away as at 35 to permit communication of exhaust port 17 with the passageway 32 within the enlarged end 31 of valve element 28. Thus, it will be seen that movement of valve piston 20 provides a motion that is transmitted through the shank or post 30 to valve element 28, causing the same to pivot about shoulder 34 and bring the enlarged portion 31 into selective covering relation with the upper ends 26a or 27a of the conduits which communicate with ports 26 or 27, respectively.

Mounted in bore 29 upward of shank 30 is spring 29a which serves to urge valve element 28 against the top surface of sub-body 25 and effect a seal between valve element 28 and the top surface. This seal can be improved by constructing element 28 of a slightly resilient plastic material such as nylon, while sub-body 25 may be equipped with a special aluminum facing plate as at 25a.

When valve element 28 is shifted from a position intermediate ports 26a and 27a into covering relation with one of these ports, the covered port, and thus the end of work cylinder 11 associated therewith, is communicated with exhaust port 17. The uncovered port remains in communication with inlet port 16 and continues to deliver pressurized fluid to work cylinder 11. In Fig. 2, the upper portion 27a of port 27 is communicated with exhaust port 17 which reduces the pressure in the right-hand portion of cylinder 11, causing portion 14a to move to the right from the position shown in Fig. 1. I have found that very satisfactory operation of work cylinders can be achieved by regulating the exhaust from the end of the cylinder to which the piston is desired to be moved, as contrasted to previous expedients in which additional pressure was supplied to the end of the cylinder from which the piston was to be moved.

Referring now to the upper part of the valve assembly, the means by which valve piston 20 is moved can be seen. This means includes a pair of extension cylinders 36 and 37 which are mounted on the ends of cylinder 19. The outer ends of each extension cylinder 36 and 37 are provided with passageways 36a and 37a, respectively, which communicate with poppet valves 36b and 37b, respectively. Thus, depression of the poppet element in either poppet valve 36b or 37b establishes communication between the interior of the associated extension cylinder and the atmosphere. Slidingly mounted in extension cylinders 36 and 37 are pistons 38 and 39, respectively. Each piston 38 and 39 is provided with an annular sealing cup (designated 38a and 39a, respectively), and with a longitudinal bore 38b and 39b. The inner end of each piston 38 and 39 is provided with a projection or extension 38c and 39c, respectively.

The inner end of each extension cylinder 36 and 37 is provided with a fluid-tight barrier as at 40 and 41 which separates the extension cylinder from the primary cylinder 19. An opening is provided in each barrier 40 and 41 through which the projection 38c or 39c extends, the fluid-tight sealing relation being promoted through the use of annular sealing-cups 40a and 41a. Each of extension cylinders 36 and 37 is provided with a vent port adjacent to and outward of the associated barriers 40 and 41, the vent ports being designated 42 and 43, respectively.

To communicate pressurized fluid from inlet port 16 with extension cylinders 36 and 37, valve piston 20 is provided with a longitudinal bore 44 which communicates with recess 29. Thus, pressurized fluid from inlet 16 enters cylinder 19 by flowing through one or both of recesses 21. Fluid from recesses 21 flows into aperture 23 and thence into recess 29, from which it is able to pass into the longitudinal bore 44. Longitudinal bore 44 is aligned with the longitudinal bores 38b and 39b in pistons 38 and 39, so pressurized fluid from inlet port 16 is able to flow to the extension cylinders 36 and 37, thereafter to be exhausted as desired through poppet valves 36b and 37b.

A description of the operation of the valve, particularly with respect to the movement of valve piston 20, follows herewith.

Operation

Where, for example, it is desired to move the piston of work cylinder 11 to the right, it is only necessary to depress the right-hand poppet valve (in the pictured embodiment designated 36b) for so long as is necessary to move the piston the desired distance. When poppet valve 36b is opened by depressing the poppet element, the pressure in extension cylinder 36 is decreased. To promote this decrease, I provide longitudinal bore 44 with a constriction 45 on each side of recess 29. The flow capacity of bore 44 is thus less than the flow capacity of the bleed line from extension cylinder 36 to and through poppet valve 36b. Once the pressure is decreased within extension cylinder 36, its piston 38 moves to the right into the reduced pressure portion of extension cylinder 36. Movement of piston 38 is brought about by movement of piston 20 to the right, since fluid from the right-hand end of cylinder 19 (in the chamber designated A in Fig. 1) is exhausted through poppet valve 36b after having passed around the end of projection 38c and through longitudinal bore 38b. It is to be appreciated that the abutting ends of piston 20 and projection 38c are not in a sealing relation, so that fluid can pass therebetween. Movement of piston 38 to the right creates a chamber B (seen in Fig. 2) between the inner end of piston 38 and barrier 40. Chamber B is completely isolated from the pressurized fluid within valve 10 and is in communication with the atmosphere through vent passage 42.

When poppet valve 36b is closed, as would be the case when the piston in work cylinder 11 is properly positioned, piston 38 will usually be in the position shown in Fig. 2 (i.e., at the extreme right-hand end of extension cylinder 36). The movement of piston 38 to the right is quite rapid, and except for infinitesimally short openings of poppet valve 36b, will be in the position indicated in Fig. 2. Closure of poppet valve 36b permits a build-up of fluid pressure against the outer end of piston 38 inasmuch as again there is no sealing relation between the end of the piston and the outer end of cylinder 36. The inner end of piston 38 is subject only to atmospheric pressure that exists within space B. Piston 20 is subject to equal pressures at each end, so it will move to the left under the influence of piston 38, which is under a pressure differential just described. Movement to the left of pistons 38 and 20 continues until space B is destroyed and piston 38 is at the extreme left end of its stroke.

From the foregoing, it will be seen that once the piston within work cylinder 11 is moved to the desired position, it is subjected to equal pressures at both ends because of the self-balancing nature of piston 20 within valve 10. As can be appreciated from a consideration of Fig. 1, whenever piston 20 is balanced, so also will piston 14a be balanced. Thus, piston 14a is subjected to a pressure differential only during the time it is moving, and this by venting one side.

A modified form of my invention will now be described in conjunction with Figs. 5–6. In the modified form shown in those figures, the upper portion of the valve, i.e., cylinder 18 and extension cylinders 36 and 37 with their associated components, are identical to those portions shown in Figs. 1 and 2. The differences between the two forms lie wholly in the construction of the sub-body which is designated 25 in Figs. 1 and 2 and which, for purposes of clarity, is designated by the numeral 125 in Figs. 3 and 5. Elements in Figs. 3 and 5 identical with those in Figs. 1 and 2 will be given like designations except for the increase of the numeral by 100.

In Figs. 5 and 6, it is to be noted that sub-body 125 is equipped with outlet ports 126 and 127, the upper portions of which are enlarged to serve as cylinders and in which are housed pistons 146 and 147, respectively. In Fig. 5, pistons 146 and 147 are shown at the extreme lower end of their travel, while in Fig. 6, these pistons are shown at the extreme upper end of their travel. The position shown in Fig. 5 occurs whenever piston 120 is balanced, while the position of pistons 146 and 147, as shown in Fig. 6, occurs whenever piston 120 is moved from a centered position, i.e., to the right as shown in Fig. 6.

Pistons 146 and 147 thus serve as check valves, since in the position shown in Fig. 5 they effectively close off communication between ports 126 and 127 and chamber 124. This has been found desirable in these installations where the piston 14a of a work cylinder 11 operates against a resisting force. Such would be the case where the work cylinder is mounted vertically and a weight attached to the end of piston rod 14. A typical installation might be in a hoisting mechanism. Once the hoisting cylinder piston is positioned in the device shown in Figs. 1 and 2, both sides of the piston 14a are in communication with each other and identical pressures are applied thereto. When one side of the piston 14a is subjected to an additional force, as in carrying a weight, the equal pressures on each side of piston 14a provided by the valve 10 are ineffective to immobilize the piston 14a in such a loaded or stressed condition. The weight on one side of the piston will cause a shift in the fluid from that side to the other side, whereby the piston will gradually move downward or in the direction of the weighted side, as the case may be. However, by introducing means for checking the flow of fluid pressure into and out of the two sides of the work cylinder whenever the valve is in a balanced position, the undesirable movement of the work piston is avoided. It is for this purpose that pistons 146 and 147 are provided.

Referring now to Fig. 5, and piston 146 in particular (it being understood that piston 147 is identical thereto), it is seen that piston 146 is provided with an upper annular flange 146a which is connected to the main body of the piston by a constricted stem portion 146b. The main portion of piston 146 carries an O-ring seal, as at 146c, for which a suitable annular groove is provided. Thus, pressurized fluid above the main portion of piston 146 is prevented from flowing therepast to the bottom side of the main portion of piston 146. Intermediate the length of the piston casing provided by the inner portion 126a of port 126, is provided an O-ring seal 148. O-ring seal 148 is slightly compressed by the side walls of flange 146a and thereby seals off port 126 from the extreme upper portion of the casing in which piston 146 is mounted. In contrast to this, the condition of the elements in Fig. 6 shows that the seal between O-ring 148 and upper flange 146a is broken (by having piston 146 move upwardly) so that pressurized fluid in chamber 124 is adapted to flow through port 126 and into any work cylinder connected thereto. To achieve this, port 126 communicates with the piston casing provided by passage 126a at a point below seal 148.

Upward movement of piston 146 is limited by an abutment member 149 which can be conveniently provided as part of the insert structure into piston casing or bore 126a, which structure provides the port for O-ring seal 148. Conveniently, all of this can be achieved by counterboring sub-body 125 to provide an annular shoulder as at 150, supporting on shoulder 150 a flanged sleeve which provides abutment member 149, and then mounting O-ring seal 148 above the flanged portion of the abutment member 149. To insure immobility of the abutment member 149 and O-ring seal 148, an insert sleeve 151 is pressed into bore 126a, followed by a smaller O-ring seal 152. The assembled elements 148—152 are thereafter maintained in place by the securing of plate 125a to sub-body 125 by suitable securing means such as bolts (not shown). The sleeve portion of abutment member 149 is provided with an opening as at 149a to permit communication between casing 126a and port 126 when the piston 146 is in the position shown in Fig. 6. As mentioned above, it will be understood that piston 147 is provided in identical form and in an identical mounting as is piston 146.

Sub-body 125 is provided with a passageway 153 which extends generally parallel to the length of bores 126a and 127a. Passageway 153 at its upper end, communicates with chamber 124 and at its lower end with bores 126a and 127a below pistons 146 and 147. Passageway 153 is also so positioned with respect to bores 126a and 127a as to be covered by valve element 28 whenever valve 28 is in a balanced position, all of which can be appreciated from a consideration of Figs. 3 and 4, wherein the upper end of passage 153 is shown midway between the openings designated 26a and 27a.

The transition of the structure shown in Fig. 5 to that shown in Fig. 6 will now be described. Inasmuch as the movement of piston 120 and the associated elements in the upper portion of each figure is identical to that discussed with respect to Figs. 1 and 2, a detailed description of the operation of the upper portion of the valve will be omitted.

*Operation*

When piston 120 is moved to the right, i.e., to the condition shown in Fig. 6, valve element 128 is pivoted clockwise to the position shown in Fig. 4, thereby uncovering the upper end of passage 153 and covering the upper end of bore 127a. Thus, passage 153, which previously had been in communication with exhaust port 17, is now open to chamber 124, as seen in Fig. 6. By the same movement of valve element 128, the upper end of bore 127a is now isolated from chamber 124 and in communication with exhaust port 17.

Pressurized fluid from inlet port 116, and therefore chamber 124, flows through passage 153 and underneath pistons 146 and 147, causing them to rise and establishing communication between the valve and the work cylinder, or the like, operated by the valve. Both pistons 146 and 147 rise rapidly upon the communication of passage 153 to chamber 124, since full fluid pressure is applied against the underside of each piston, while the upper side of each piston is at a reduced pressure. In the case of piston 147 in the condition shown in Fig. 6, the reduced pressure above that piston is provided by virtue of the fact that the upper end of bore 127 is in communication with exhaust passage 17. Where, for example, the pressurized fluid is compressed air, exhaust port 17 can be a vent to the atmosphere. In the case of piston 146, a pressure differential exists thereacross by virtue of the fact that the upper surface is of less area than the bottom surface, and where the same pressure is exerted against each surface, a lesser force will be exerted downwardly than upwardly.

In the condition of pistons 146 and 147 shown in Fig. 6, pressurized fluid from a work cylinder, or the like, is vented through port 127 and bore 127a, while pressurized fluid is introduced into the other end of a work cylinder through bore 126a and port 126. The movement of a work piston, for example, in the case of a work cylinder being operated by the valve shown in Fig. 6, creates a reduced pressure condition on one side thereof—the side communicating with port 126—so that once piston 146 is moved upwardly, there is always thereafter a slight differential in pressure between the top and bottom surfaces of piston 146 sufficient to maintain piston 146 in a raised condition.

When the work piston in any work cylinder operated by the valve shown in Figs. 5 and 6 has reached its desired location, piston 120 is returned to its central or balanced position through the sequence described with respect to Figs. 1 and 2. When this occurs, the upper end of passage 153 is once again communicated with exhaust port 17, while the upper end of bores 126a and 127a are in communication with chamber 124 and, therefore, subject to the pressure therein. Since passage 153 communicates with the bottom ends of bores 126a and 127a, a reduced pressure will exist below pistons 146 and 147, while the higher pressure stemming from fluid entering port 116 will be exerted against the top surfaces of pistons 146 and 147, causing them to move downward and into sealing relation with O-ring seals 148. Thus, there can be no interchange of fluid from port 127 to port 126 internally of the valve, so that the work piston, once positioned, remains stationary.

While, in the foregoing specification, a detailed description of the invention has been given for clearness of illustration, it will be appreciated that those skilled in the art will perceive many variations therein without departing from the spirit and scope of the invention.

I claim:

1. In a valve for transmitting pressurized fluid, a valve body having a pair of ports, a first port means in said body adapted to be connected to a source of pressurized fluid and communicating with both of said ports, a second port means for exhausting pressurized fluid from said body, a valve element movable into covering relation with either of said ports to interrupt communication of said first port means with the port so covered, passage-providing means in said valve element communicating with said second port means, said passage-providing means communicating one of said pair of ports with said second port means when said element is in covering relation with said one port, and piston means movably mounted in said body and actuatable by said pressurized fluid, said element being pivotally connected to said piston means, said piston means being operative to position said element out of covering relation with both of said ports whenever the pressure of said fluid on both ends of said piston means is the same.

2. In a valve for transmitting pressurized fluid, a valve body having a pair of ports, a first port means in said body adapted to be connected to a source of pressurized fluid and communicating with both of said ports, a second port means for exhausting pressurized fluid from said body, a valve element movable into covering relation with either of said ports to interrupt communication of said first port means with the port so covered, passage-providing means in said valve element communicating with said second port means, said passage-providing means communicating one of said pair of ports with said second port means when said element is in covering relation with said one port, and piston means in said body actuatable by said pressurized fluid and operatively connected to said element, said piston means being operative to position said element out of covering relation with both of said ports whenever the pressure of said fluid on both ends of said piston means is the same, said element being pivotally mounted over said second port means and pivotable by said piston means to bring one end thereof into selective covering relation with one of said pair of ports.

3. In a valve for transmitting pressurized fluid, a valve body having a pair of ports, a first port means in said body adapted to be connected to a source of pressurized fluid and communicating with both of said ports, a second port means for exhausting pressurized fluid from said body, a valve element movable into covering relation with either of said ports to interrupt communication of said first port means with the port so covered, passage-providing means in said valve element communicating with said second port means, said passage-providing means communicating one of said pair of ports with said second port means when said element is in covering relation with said one port, and piston means movably mounted in said body and actuatable by said pressurized fluid, said element being pivotally connected to said piston means, said piston means being operative to position said element out of covering relation with both of said ports whenever the pressure of said fluid on both ends of said piston means is the same, said element being an elongated member having a passage extending longitudinally thereof intermediate the ends thereof, said passage being open on one side, said side bearing against a planar surface internally of said body and having port-providing openings therein, the side of said body opposite said one side being equipped with an outwardly extending post, said post being coupled to said piston means.

4. In a valve for transmitting pressurized fluid, a valve body having a pair of ports, a first port means in said body adapted to be connected to a source of pressurized fluid and communicating with both of said ports, a second port means for exhausting pressurized fluid from said body, a valve element movable into covering relation with either of said ports to interrupt communication of said first port means with the port so covered, passage-providing means in said valve element communicating with said second port means, said passage-providing means communicating one of said pair of ports with said second port means when said element is in covering relation with said one port, and piston means movably mounted in said body and actuatable by said pressurized fluid, said element being pivotally connected to said piston means, said piston means being operative to position said element out of covering relation with both of said ports whenever the pressure of said fluid on both ends of said piston means is the same, said piston means comprising three pistons in the same cylindrical spacing, fluid-tight barriers between the center and outer pistons, vent means in communication with the space between said barrier and its associated outer piston, extension means on each outer piston extending through the associated barrier in sliding sealing relation therewith, fluid passage means communicating the outer faces of each outer piston and both faces of the center piston with said first port means, and separate vent means in communication with the outer face of each outer piston, each of said separate vent means having a greater flow capacity than said fluid passage means.

5. The structure of claim 4 in which said element is equipped with an outwardly extending post loosely received within a recess of said central piston, said recess being in communication with said first port means, said element being pivotally mounted in said body over said second port means and movable by said central piston to bring a portion of said element into covering relation with one of said pair of ports.

6. In a valve for transmitting pressurized fluid, a valve body, a piston slidably mounted in a cylinder provided in said body, a valve element extending laterally of said piston and movable therewith, said body being equipped with a fluid inlet port, a fluid outlet port, and a pair of flow ports, said valve element having a passage therein in continuous communication with said fluid outlet port and being movable to bring said valve element passage into communication with either of said pair of flow ports, means for introducing pressurized fluid at each end of said cylinder, said body also providing additional cylinder portions at the two ends of said cylinder and aligned with said cylinder, each of said cylinder portions having a piston slidably mounted therein and being separated from said cylinder by a fluid-tight barrier, means for introducing pressurized fluid into the space in each cylinder portion between the end thereof spaced from said cylinder and the piston in such cylinder portion, a projection on the piston in each cylinder portion, said projection extending through said barrier in fluid-tight, sealing relation therewith and being of a length sufficient to continuously be in such fluid-tight relation irrespective of the piston location in said cylinder portion, vent means in said body communicating with the space in each cylinder portion between its associated barrier and piston, and valve-actuated vent means in communication with the said first-mentioned space in each cylinder portion in communication with the end of the cylinder associated with said cylinder portion.

7. In a valve for transmitting pressurized fluid, a valve body having a pair of ports, a first port means in said body adapted to be connected to a source of pressurized fluid communicating with both of said ports, a second port means for exhausting pressurized fluid from said body, a valve element movable into covering relation with either of said ports to interrupt communication of said first port means with the port so covered, passage-providing means in said valve element communicating with said second port means, said passage-providing means communicating one of said pairs of ports with said second port means when said element is in covering relation with said one port, a piston movably mounted in said body actuatable by said pressurized fluid and operatively connected to said element, said piston being operative to position said element out of covering relation with both of said ports whenever the pressure of said fluid on both ends of said piston is the same, a piston element adjacent each end of said piston also movably mounted in said body, each piston element being equipped with an enlarged portion remote from said piston, said body providing chambers in which said enlarged portions move, said chambers being equipped with vents, and means in said ports for preventing fluid flow through said ports whenever said valve element is out of covering relation with both of said ports.

8. The structure of claim 7, in which the said last-mentioned means permits fluid flow through both of said ports whenever said valve element is in covering relation with either of said ports.

9. The structure of claim 7, in which said last-mentioned means includes piston means slidable in each port and movable only by pressure differences existing across said piston means.

10. In a valve for transmitting pressurized fluid, a valve body having a pair of ports, a first port means in said body adapted to be connected to a source of pressurized fluid and communicating with both of said ports, a second port means for exhausting pressurized fluid from said body, a valve element movable into covering relation with either of said ports to interrupt communication of said first port means with the port so covered, passage-providing means in said valve element communicating with said second port means, said passage-providing means communicating one of said pairs of ports with said second port means when said element is in covering relation with said one port, piston means in said body actuatable by said pressurized fluid and operatively connected to said element, said piston means being operative to position said element out of covering relation with both of said ports whenever the pressure of said fluid on both ends of said piston means is the same, and a second body associated with said valve body and having a pair of passages therein communicating with said ports, check valve means in each of said passages, said check valve means closing said passages whenever said element is out of covering relation with both of said ports, said second body being provided with a third passage having a port covered by said element whenever said element is out of covering relation with both of said pair of ports, said third passage communicating with said pair of passages on the side of said check valve means remote from said pair of ports.

11. The structure of claim 10, in which each of said pair of passages in said second body is equipped with a port intermediate the length thereof and on the side of said check valve means remote from said pair of ports, said passage port being isolated from the end of said third passage remote from the port in said third passage.

12. The structure of claim 11, in which each of said passages is equipped with a piston slidably mounted therein, said pistons having an intermediate constricted portion, the end of said piston adjacent the end of said third passage being in continuous sealing relation with the side walls of its associated passage and the other end of said piston being movable out of sealing relation with the side walls of the said associated passage, said passage port communicating with said passage opposite the constricted portion of said piston.

13. In a valve for transmitting pressurized fluid, a valve body having an internal chamber, two flow passages communicating with said chamber, first port means in said body adapted to be connected to a source of pressurized fluid and communicating with said chamber, second port means in said body for exhausting pressurized fluid from said chamber, a valve element in said chamber continuously in passage-providing communication with said second port means and pivotable about said second port means into communication with either of said passages to interrupt the communication of said chamber and the passage communicated with said second port means by said valve element, means in said valve for pivoting said valve element, said pivoting means being actuatable by said pressurized fluid and being operative to position said element out of passage-providing communication with both of said passages upon the cessation of a signal to said valve, and means for applying a signal to said valve.

14. The structure of claim 13, in which each of said passages is equipped with check valve means operative to close off communication between said passages and said chamber upon said signal cessation.

15. In a valve for transmitting pressurized fluid, a valve body, a piston slidably mounted in a cylinder provided in said body, a valve element extending laterally of said piston and movable therewith, said valve element being pivotally mounted over an exhaust port provided in said body, fluid passage means for introducing pressurized fluid at each end of said cylinder, said body also providing two additional cylinder portions at the two ends of said cylinder and aligned with said cylinder, each of said cylinder portions having a piston slidably mounted therein and being separated from said cylinder by a fluid-tight barrier, means for introducing pressurized fluid into the space in each cylinder portion between the end thereof spaced from said cylinder and the piston in such cylinder portion, a projection on the piston in each cylinder portion, said projection extending through said barrier in fluid-tight, sealing relation therewith and being of a length sufficient to be continuously in fluid-tight relation irrespective of the piston location in said cylinder portion, vent means in said body communicating with the space in each cylinder portion between its associated barrier and piston, valve-actuated vent means in communication with the said first-mentioned space in each cylinder portion in communication with the ends of the cylinder associated with said cylinder portion, each of said valve-actuated vent means having a greater flow capacity than said fluid passage means.

16. The structure of claim 15, in which said valve element is equipped with a flow passage adapted to selectively communicate said exhaust port with any one of three conduits in said body, two of said conduits being coupled to the ends of external work cylinder means, and check valve means in said two conduits operative to prevent fluid flow therein whenever said valve element establishes communication between said exhaust port and the third of said conduits.

17. The structure of claim 16, in which the said third conduit communicates with the said two conduits on both sides of said check valve means.

18. The structure of claim 15, in which said valve body is provided with an internal chamber housing the portion of said valve element pivotal about said exhaust port, said chamber being equipped with a pair of ports communicating with flow conduits adapted to be coupled to an external work cylinder means, each of said pair of ports being communicable with said exhaust port in different pivotal positions of said valve element, each of said conduits being equipped with a piston slidably mounted therein and operative in one position to prevent communication between said chamber and the portion of its associated conduit remote from said chamber, said one position being assumed by said pistons whenever said valve element is out of a position establishing communication between either of said pair of ports and said exhaust port.

References Cited in the file of this patent

UNITED STATES PATENTS

| | | |
|---|---|---|
| 2,618,121 | Tucker | Nov. 18, 1952 |
| 2,681,045 | Klessig et al. | June 15, 1954 |
| 2,725,077 | Nicholl | Nov. 29, 1955 |